(12) United States Patent
Gonsalves

(10) Patent No.: US 6,933,948 B2
(45) Date of Patent: *Aug. 23, 2005

(54) MULTI-TONE REPRESENTATION OF A DIGITAL IMAGE ON A DIGITAL NONLINEAR EDITING SYSTEM

(75) Inventor: Robert Gonsalves, Wellesley, MA (US)

(73) Assignee: Avid Technology, Inc., Tewksbury, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/321,271

(22) Filed: Dec. 17, 2002

(65) Prior Publication Data
US 2003/0071824 A1 Apr. 17, 2003

Related U.S. Application Data

(63) Continuation of application No. 09/293,732, filed on Apr. 16, 1999, now Pat. No. 6,552,731.

(51) Int. Cl.$^7$ .................................................. G09G 5/02
(52) U.S. Cl. ...................... 345/589; 358/1.9; 358/520; 382/169; 382/274
(58) Field of Search ......................... 345/589; 382/162, 382/167, 169; 358/1.9, 3.21, 3.22

(56) References Cited

U.S. PATENT DOCUMENTS

| | | |
|---|---|---|
| 4,189,742 A | 2/1980 | Klopsch |
| 4,272,780 A | 6/1981 | Belmares-Sarabia et al. |
| 4,298,885 A | 11/1981 | Okada |
| 4,367,465 A | 1/1983 | Mati et al. |
| 4,385,311 A | 5/1983 | Harwood et al. |
| 4,410,908 A | 10/1983 | Belmares-Sarabia et al. |
| 4,418,358 A | 11/1983 | Poetsch et al. |
| 4,488,245 A | 12/1984 | Dalke et al. |
| 4,492,978 A | 1/1985 | Thomas |

(Continued)

FOREIGN PATENT DOCUMENTS

| | | |
|---|---|---|
| EP | 0 205 332 | 10/1990 |
| EP | 0 512 839 | 11/1992 |
| EP | 0 517 035 | 12/1992 |
| EP | 0594312 | 4/1994 |
| EP | 0 494 325 | 11/1995 |
| EP | 0702 832 | 3/1996 |
| EP | 0 709 806 | 5/1996 |
| EP | 0871177 | 10/1998 |
| EP | 0 741 492 | 3/1999 |
| GB | 2 312 120 | 10/1997 |
| GB | 2 312 348 | 10/1997 |
| WO | WO 94/29868 | 12/1994 |
| WO | WO 96/13807 | 5/1996 |
| WO | WO 97/06631 | 2/1997 |
| WO | WO 97/39452 | 10/1997 |
| WO | WO 98/11510 | 3/1998 |

OTHER PUBLICATIONS

Discreet Logic, Inc Manual. "enter*", Apr. 1999, pp. 103–128.*
U.S. Appl. No. 09/293,590, filed Apr. 16, 1999, Cacciatore et al.
U.S. Appl. No. 09/293,259, filed Apr. 16, 1999, Cacciatore et al.
U.S. App. No. 09/293,730, filed Apr. 16, 1999, Gonsalves et al.

(Continued)

Primary Examiner—Kent Chang
(74) Attorney, Agent, or Firm—Peter J. Gordon (57) ABSTRACT

A system and method for generating a multi-tone representation of a digital image by applying a plurality of functions of luma to the digital image. The functions of luma comprise at least a first function and a second function, where each function has a value for each luma value in a range of luma values. Each function also has an associated display value. The digital image includes a plurality of pixels, where for each pixel, it is determined which of the first and second functions has a maximum value for a luma value of the pixel. Each pixel is represented using the display value associated with the determined function.

21 Claims, 6 Drawing Sheets

U.S. PATENT DOCUMENTS

| | | |
|---|---|---|
| 4,571,632 A | 2/1986 | Schaphorst et al. |
| 4,599,643 A | 7/1986 | Harlan |
| 4,602,286 A | 7/1986 | Kellar et al. |
| 4,642,632 A | 2/1987 | Ohyagi et al. |
| 4,642,676 A | 2/1987 | Weinger |
| 4,679,067 A | 7/1987 | Belmares-Sarabia et al. |
| 4,694,329 A | 9/1987 | Belmares-Sarabia et al. |
| 4,698,666 A | 10/1987 | Lake, Jr. et al. |
| 4,727,412 A | 2/1988 | Fearing et al. |
| 4,733,230 A | 3/1988 | Kurihara et al. |
| 4,750,050 A | 6/1988 | Belmares-Sarabia et al. |
| 4,763,186 A | 8/1988 | Belmares-Sarabia et al. |
| 4,782,397 A | 11/1988 | Kimoto |
| 4,794,460 A | 12/1988 | Shiota |
| 4,797,733 A | 1/1989 | Takagi et al. |
| 4,811,084 A | 3/1989 | Belmares-Sarabia et al. |
| 4,823,184 A | 4/1989 | Belmares-Sarabia et al. |
| 4,827,344 A | 5/1989 | Astle et al. |
| 4,857,994 A | 8/1989 | Belmares-Sarabia et al. |
| 4,862,251 A | 8/1989 | Belmares-Sarabia et al. |
| 4,866,511 A | 9/1989 | Belmares-Sarabia et al. |
| 4,876,589 A | 10/1989 | Orsburn et al. |
| 4,907,071 A | 3/1990 | Belmares-Sarabia et al. |
| 5,038,206 A | 8/1991 | Ubukata |
| 5,070,397 A | 12/1991 | Wedderburn-Bisshop |
| 5,089,882 A | 2/1992 | Kaye et al. |
| 5,129,013 A | 7/1992 | Holzmann et al. |
| 5,130,789 A | 7/1992 | Dobbs et al. |
| 5,134,688 A | 7/1992 | Corthout |
| 5,140,416 A | 8/1992 | Tinkler |
| 5,142,273 A | 8/1992 | Wobermin |
| 5,146,325 A | 9/1992 | Ng |
| 5,153,937 A | 10/1992 | Wobermin et al. |
| 5,179,641 A | 1/1993 | Comins et al. |
| 5,181,113 A | 1/1993 | Chang |
| 5,218,671 A | 6/1993 | Liao et al. |
| 5,253,043 A | 10/1993 | Gibson |
| 5,283,651 A | 2/1994 | Ishizuka |
| 5,289,295 A | 2/1994 | Yumiba et al. |
| 5,313,275 A | 5/1994 | Daly et al. |
| 5,317,678 A | 5/1994 | Okawara et al. |
| 5,325,449 A | 6/1994 | Burt et al. |
| 5,341,372 A | 8/1994 | Kirkham |
| 5,373,327 A | 12/1994 | McGee et al. |
| 5,381,185 A | 1/1995 | Ohki et al. |
| 5,392,385 A | 2/1995 | Evangelisti et al. |
| 5,398,123 A | 3/1995 | Katsuma |
| 5,418,895 A | 5/1995 | Lee |
| 5,420,971 A | 5/1995 | Westerink et al. |
| 5,438,651 A | 8/1995 | Suzuki et al. |
| 5,444,835 A | 8/1995 | Turkowski |
| 5,450,134 A | 9/1995 | Legate |
| 5,479,590 A | 12/1995 | Lin |
| 5,488,429 A | 1/1996 | Kojima et al. |
| 5,488,674 A | 1/1996 | Burt et al. |
| 5,506,946 A | 4/1996 | Bar et al. |
| 5,510,843 A | 4/1996 | Keene et al. |
| 5,510,851 A | 4/1996 | Foley et al. |
| 5,532,751 A | 7/1996 | Lui |
| 5,557,334 A | 9/1996 | Legate |
| 5,557,339 A | 9/1996 | Dadourian |
| 5,557,340 A | 9/1996 | Millward |
| 5,600,376 A | 2/1997 | Casavant et al. |
| 5,611,030 A | 3/1997 | Stokes |
| 5,615,324 A | 3/1997 | Kuboyama |
| 5,625,421 A | 4/1997 | Faroudja et al. |
| 5,630,037 A | 5/1997 | Schindler |
| 5,633,687 A | 5/1997 | Bhayani et al. |
| 5,636,290 A | 6/1997 | Kita et al. |
| 5,638,136 A | 6/1997 | Kojima et al. |
| 5,638,138 A | 6/1997 | Hickman |
| 5,645,884 A | 7/1997 | Harlow, Jr. et al. |
| 5,657,094 A | 8/1997 | Moriwake |
| 5,659,639 A | 8/1997 | Mahoney et al. |
| 5,661,525 A | 8/1997 | Kovacevic et al. |
| 5,663,765 A | 9/1997 | Matsuse et al. |
| 5,682,443 A | 10/1997 | Gouch et al. |
| 5,703,654 A | 12/1997 | Iizuka |
| 5,703,659 A | 12/1997 | Tanaka |
| 5,715,073 A * | 2/1998 | Miller ..................... 358/534 |
| 5,715,377 A | 2/1998 | Fukushima et al. |
| 5,729,360 A | 3/1998 | Kita et al. |
| 5,745,121 A | 4/1998 | Politis |
| 5,754,180 A | 5/1998 | Kivolowitz et al. |
| 5,770,299 A | 6/1998 | Dannenhauer et al. |
| 5,774,112 A | 6/1998 | Kasson |
| 5,805,169 A | 9/1998 | Harada et al. |
| 5,888,444 A | 3/1999 | Dannenhauer et al. |
| 5,943,045 A * | 8/1999 | Ikeshoji et al. ............. 382/162 |
| 6,002,842 A * | 12/1999 | Oshio et al. ................. 358/1.9 |
| 6,078,687 A * | 6/2000 | Venkateswar ............... 382/169 |
| 6,111,980 A * | 8/2000 | Sano et al. ................. 382/169 |
| 6,552,731 B1 | 4/2003 | Gonsalves |
| 6,608,927 B2 * | 8/2003 | Ohta .......................... 382/167 |

OTHER PUBLICATIONS

U.S. Appl. No. 09/392,823, filed Sep. 9, 1999, Gonsalves et al.

U.S. Appl. No. 09/545,644, filed Apr. 7, 2000, Cooper et al.

Avid Media Illusion Reference Guide, Jul. 1996, pp. 101–102 (No9.101).

Discreet Logic, Inc. Manual, "enter*", Apr. 1999, pp. 103–128.

Discreet Logic, Inc. Manual, "smoke*", Jul. 1998, pp. 552–554.

Kieran, Michael, "The Color Scanning Success Handbook", 1997, pp. 121–162.

Ohanian, Thomas A., "Digital Nonlinear Editing: New Approaches to Editing Film and Video", 1993, pp. 103–153.

Alan Wm. Paeth, Distance Approximations and Bounding Polyhedra, copyright© 1995 by Academic Press, Inc., pp 78–87.

James D. Foley and Andries Van Dam, Fundamentals of Interactive Computer Graphics copyright© 1982 by Addison–Wesley Publishing Company, Inc., pp. 245–249.

Eric N. Mortenson and William A. Barrett, Intelligent Scissors for Image Composition Computer Graphics Proceedings, Annual Conference Series 1995, Siggraph 95 Conference Proceedings Aug. 6–11, 1995. A publication of ACM Siggraph, pp. 191–198.

*Alvy Ray Smith and James P. Blinn, Blue Screen Matting, Computer Graphics Proceedings, Annual Conference Series, 1996, Siggraph 96, New Orleans, Louisiana, Aug. 4–9, 1996, pp. 259–268.

* cited by examiner

MULTI-TONE REPRESENTATION OF A DIGITAL IMAGE ON A DIGITAL NONLINEAR EDITING SYSTEM

This application is a continuation of U.S. Ser. No. 09/293,732, filed on Apr. 16, 1999 now U.S. Pat. No. 6,552,731.

BACKGROUND

Digital non-linear editing (DNLE) is a process by which digital media may be edited. DNLE, as the name implies, is performed on digital media stored as data in digital media files on a digital random access medium. DNLE may be conducted in a non-linear fashion because the digital media files in which the digital media is stored can be randomly accessed. Thus an editor may access a piece of the digital media without having to proceed sequentially through other pieces of the digital media stored in the same or other digital media files. More than one editor also may be able to access different pieces of the same digital media contemporaneously. The digital media may be a digitized version of a film or videotape or digital media produced through live capture onto a disk of a graphics or animation software application. Example commercial DNLE systems include the Media Composer® or the Avid® Symphony™ video production system or, NewsCutter® news editing system available from Avid Technology, Inc. For a more detailed description of DNLE, see *Digital Nonlinear Editing, New Approaches to Editing Film and Video,* 1993, by Thomas Ohanian.

Color modification is a class of operations that may be performed on media data. Color modification is used both to correct color errors due to process errors and to adjust the colors used in the video for artistic expression. Such color modifications may include enhancing contrasts or color in an image to give a program an overall "look," or applying special effects to selected segments. Other color modifications may be made by an editor to correct problems with color or lighting resulting from the source of the media. Such corrections may include color balancing for camera and lighting differences, correcting for film processing differences, matching colors and tones from shot to shot, or adjusting video levels for differences in source tapes, source decks, etc.

Digital images are comprised of an array of picture elements called pixels. For a given image, color modifications may be applied to all pixels in the image or pixels comprising a portion of the image. In digital video signal processing, a variety of data formats can be used to represent the color of pixels within a digital image. Formats may be classified into two major categories: composite signals and component signals. Component formats represent a color as multiple components, each component defining a value along a dimension of the color space in which the color being represented is defined. A composite video is an analog signal that uses a high frequency subcarrier to encode color information. The subcarrier is a sinewave of which the amplitude is modulated by the saturation of the color represented by the signal, and the hue of the color is encoded as a phase difference from a color burst. Analog composite signals are generally used to broadcast television video signals.

There are a variety of component formats used to represent color. RGB (Red, Green, Blue) format represents a color with a red component, a green component and a blue component. CMY (Cyan, Magenta, Yellow, Black) format represents a color with a cyan component, a magenta component, and a yellow component. CMY is a format commonly used by printers. The CMY components are color opposites of RGB components. In a three-dimensional coordinate system, each component of either the RGB or the CMY format represents a value along an axis, the combination of the values defining a cubic color space.

The data formats HSL (Hue, Saturation, Lightness or Luminance) and HSV (Hue, Saturation, Value) represent a color with a hue component, a saturation component, and a luma component. In a three-dimensional coordinate system, the luma component represents a value along a luma axis, the hue component represents the angle of a chroma vector with respect to the luma axis and the saturation component represents the magnitude of the chroma vector. The combination of the values defines a hexagonal cone-shaped color space.

YCrCb, YUV, and YIQ are three formats that represent a color with a luma component Y, and two chroma components, Cr and Cb, U and V, or I and Q, respectively, that define a chroma vector. In a three-dimensional coordinate system, each component of either the YCrCb, YUV, and YIQ format represents a value along an axis, the combination of the values defining a cylindrical color space around the luma axis. The chroma components define the chroma vector. In data formats with a luma component, the luma component can be used independently to represent a pixel in a black and white image to be displayed, for example, with a black and white monitor.

A typical color modification in HSL color space may include increasing a color component or a combination of color components for all pixels in each digital image of a section of digital media. Typically, an editor accesses a segment of a composition that represents the section of media through an editor interface and inputs desired color modifications through the editor interface. Some systems permit an editor to apply color modifications to only portions of a digital image. Portions of a digital image also may be described as one or more pixels. For example, an editor may select with a mouse, keyboard, or some other editor input device a portion of the image and define color modifications for the selected portion. A suitable commercial system for color modification is Avid Media Illusion™ available from Avid Technology, Inc. The Avid Media Illusion Reference Guide, available from Avid Technology, Inc. is herein incorporated by reference. Other commercial software applications may be used.

Some systems permit an editor to define a color modification as a function of the luma of a pixel. Some systems also allow a user to define functions of luma that allow an editor to define the effect of a color modification over a range of possible luma values of a pixel. For example, an editor may define a highlight function that primarily affects high luma values, a midtone function that primarily affects mid-range luma values, and a shadow function that primarily affects low luma values. The editor may then associate a color modification with each function. If more than one function is defined over a range of luma values, each function, and thus a color modification associated with the function, may have a weighted effect for a given luma value. This weighted effect is defined by the value of the function for the given luma value normalized with respect to the values of functions for the given luma value. Although luma may be used to determine the weighting of the color modification, the color modification itself is not limited to adjusting the luma. Typical color modifications include adjustments to hue, saturation, luminance, brightness, contrast, gamma, tinting, etc.

For example, a color modification A is specified for a luma function defined by $X=2L-2$, and a color modification B is specified for a luma function defined by $Y=0.5L+2$. For pixel P with a luma value of 16, $X=30$ and $Y=10$. Normalizing X and Y, the weighted value of X is 0.75 and the weighted value of Y is 0.25. Thus, the color modification applied to pixel P is Z=0.75A+0.25B. The function used in this example is linear to simplify the explanation, but for decreasing and increasing the effect of a color modification for different values of luma, the function is usually non-linear.

The range of possible luma values may have ranges in which one of the functions has a predominant effect. For the highlight, midtone, and shadow functions described above, a highlight range is the range of luma values for which the highlight function has the strongest effect or the greatest weighted value, a midtone range is the range of luma values for which the midtone function has the strongest effect or the greatest weighted value, and the shadow range is the range of luma values for which the shadow function has the strongest effect or the greatest weighted value.

Some systems allow an editor to view a visual representation of the effect of more than one luma function on a digital image, where a selected luma function is emphasized. This representation generally is a substantially continuous gray scale image. In the gray scale image, pixels represented as white are pixels having a luma value for which the selected function has the strongest contribution. Pixels represented as black are pixels having a luma value for which the selected luma function has no contribution. All other pixels are represented as levels of gray between white and black, where the gray level representing the pixel is inversely proportional to the weighted value of the luma function for the luma value of the pixel. A suitable commercial product for defining luma functions, defining color modifications for each function, and viewing a representation of an image emphasizing a selected luma function is Avid Media Illusion ™ available from Avid Technology, Inc.

SUMMARY

A problem with systems allowing an editor to define luma functions and color modifications for each luma function is that an editor cannot always determine from a visual inspection of a digital image which pixels or portions of the image fall within a luma range. Thus the editor may not know which pixels will be most affected by a color modification defined for a function. Even if an editor may view the effects of more than one function on a digital image in gray scale, with a selected function emphasized, this gray scale image does not illustrate the boundaries of the luma ranges, and thus does not give the editor a clear illustration of which function has the strongest effect for a range of luma values. The gray scale image also emphasizes only one luma function at a time. For a selected function, the gray scale image also may be confusing and not intuitive because the gray scale image may not represent the pixels in proportion to their luma. For example, if a midtone function is selected, pixels having a value for which the midtone function has the highest weighted value are represented as white, which has high luma, and pixels affected more by a highlight function, usually pixels having higher luma values, are represented as darker grays which have lower luma. For an editor, especially a novice to color modification, this confusion may result in a lack of efficiency.

Providing a multi-tone representation of a digital image, where each tone represents a luma range, permits an editor to visually identify pixels of a digital image that fall within predefined luma ranges. This multi-tone representation allows an editor to control the effect of luma-based color modifications to pixels in a more efficient manner.

Multi-tone representation of a digital image provides a method of producing a representation of a digital image by applying a plurality of functions of luma to the digital image. The luma functions may be selected and redefined by a user.

The functions of luma comprise at least a first function and a second function, where each function has a value for each luma value in a range of luma values. Each function also has an associated display value. The digital image includes a plurality of pixels, where for each pixel, it is determined which of the first and second functions has a maximum value for a luma value of the pixel. Each pixel is represented using the display value associated with the determined function. The representation of the digital image may be displayed on a display device. Each pixel of the representation may be displayed as the level of gray represented by the display value determined for each pixel.

In one embodiment, each display value associated with one of the functions represents a level of gray. In an alternative embodiment, each display value associated with one of the functions represents a color.

BRIEF DESCRIPTION OF THE DRAWINGS

In the drawings,

FIG. 2b is an illustration of a three-tone image of the spherical object of FIG. 2a;

DETAILED DESCRIPTION

The following detailed description should be read in conjunction with the attached drawing in which similar reference numbers indicate similar structures. All references cited herein are hereby expressly incorporated by reference.

Figure 1:
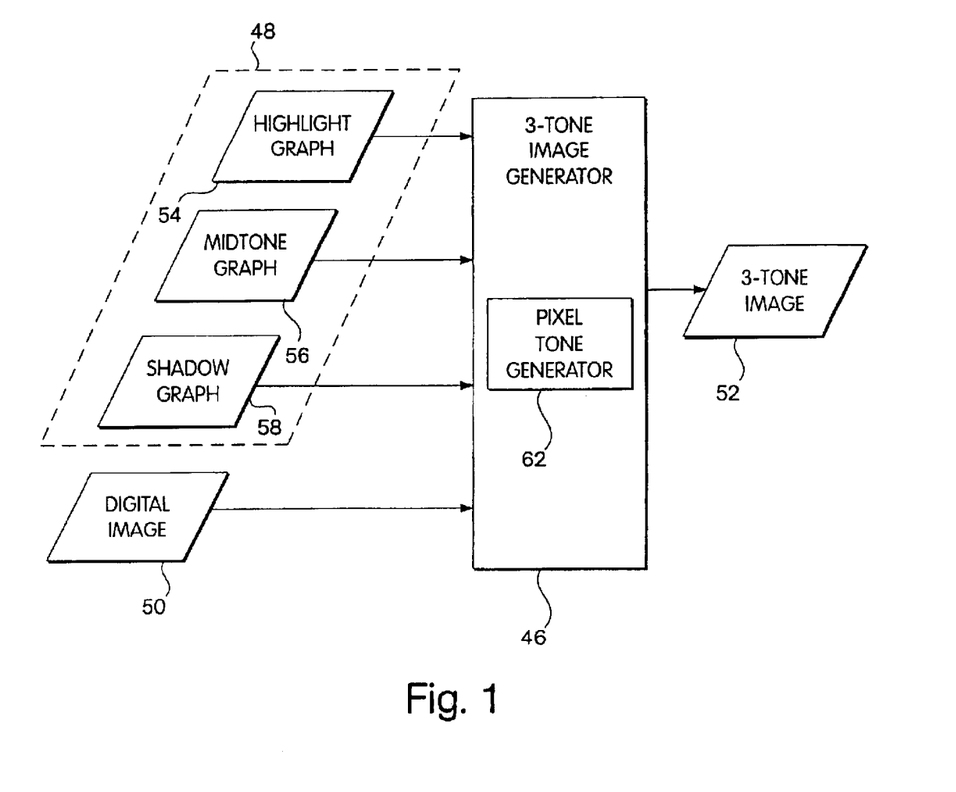
FIG. 1 is a data flow diagram illustrating an embodiment of a three-tone image generating system.

FIG. 1 is a data flow diagram illustrating three-tone image generation. A three-tone image generator 46 receives luma graphs 48 that include a highlight graph 54, a midtone graph 56, and a shadow graph 58. The graphs 54, 56, and 58 define output values of a highlight function, a midtone function, and a shadow function, respectively, as a function of a luma input value. The three-tone image generator 46 also receives the digital image 50. The three-tone image generator applies the luma graphs 48 to the digital image 50 to generate a three-tone image 52. The three-tone image generator 46 includes a pixel tone generator 62, discussed below in greater detail. Although three-tone generation is described, the system and method described herein can be used to define any number, e.g., two or more of luma graphs, and apply the graphs to a digital image. The system and method described herein also may be used to apply other graphs defining output values as a function of a color component other than luma to a digital image to produce a multi-tone image.

Figure 2A:
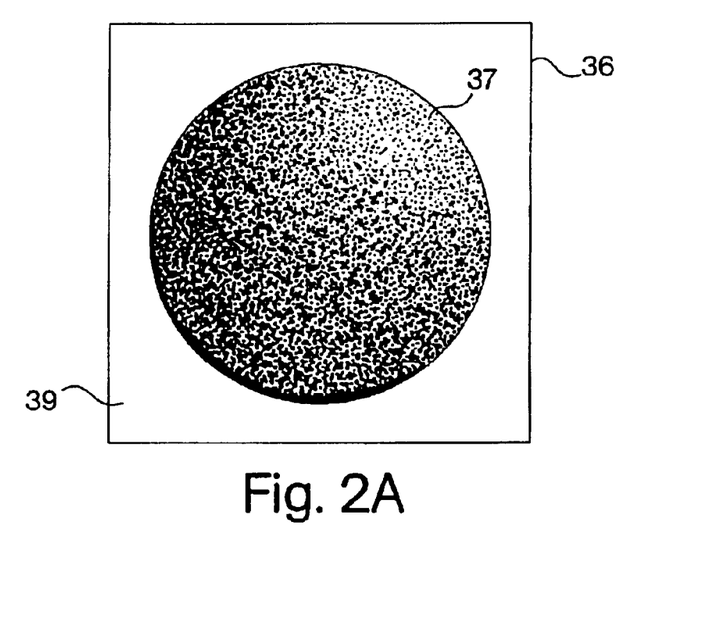
FIG. 2a is an illustration of an image including an illuminated spherical object.

FIG. 2a is an illustration of a gray scale image 36 that includes an illuminated sphere 37 and a white background 39. In FIG. 2a, a light source (not shown) illuminates the sphere 37 from the upper right hand corner of the image 36. The illumination fails to reach the lower left corner of the sphere such that the sphere goes from having high luma or highlights in its upper right region to having mid-range luma or midtones towards the middle, and low luma or shadows towards the lower left.

Figure 2B:
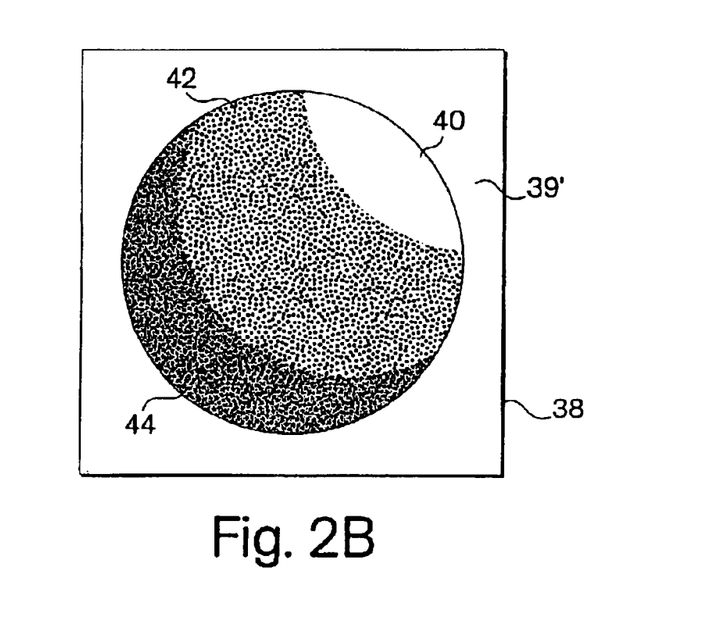

The digital image 38 of FIG. 2b is produced by applying three-tone image generation to the digital image 36. In the image 38, the various levels of luma on the sphere 37 in FIG. 2a are now represented by three discrete regions: a white region 40, a gray region 42, and a black region 44, each having a different level of gray. The regions 40, 42 and 44 correspond to three luma ranges resulting from three luma functions applied to the digital image 38. Because white has a high luma, the white background 39 of FIG. 1 is again represented as the color white at 39' in FIG. 2b. FIGS. 2a and 2b may be a representation of a color image with the chroma components removed. Although FIG. 2b uses gray, white and black, any three colors may be used to represent the three luma regions of the digital image 38.

Figure 3:
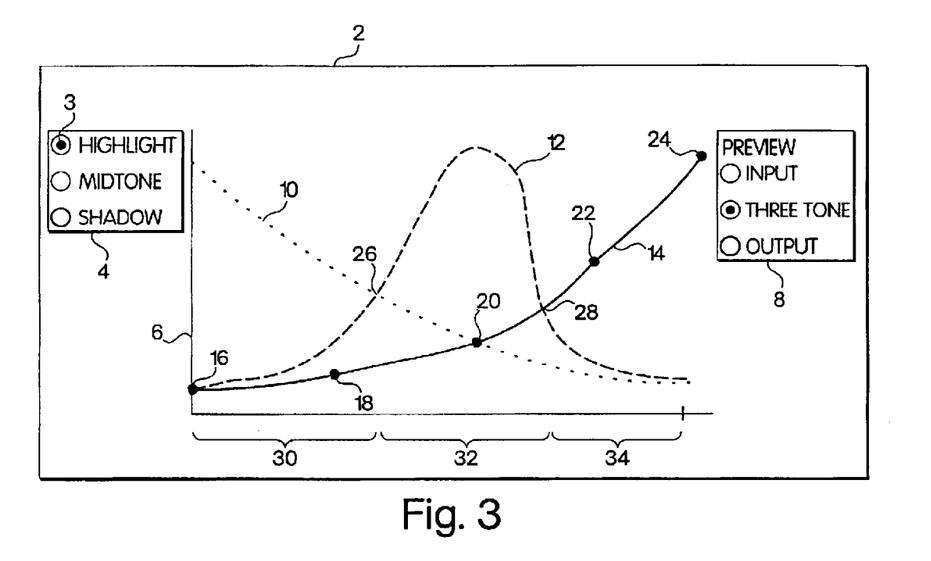
FIG. 3 is a diagram illustrating an embodiment of a user interface for defining luma ranges.

FIG. 3 illustrates an embodiment of a user interface that may be used to define the highlight graph 54, the midtone graph 56, and the shadow graph 58. In FIG. 3, the visual display 6 may include three distinct graphs sharing a common X-axis and Y-axis. Alternatively, the visual display 6 includes only one of the highlight graph 54, the midtone graph 56, and the shadow graph 58 at a time, as requested by an editor. Although not shown in FIG. 3, the Y-axis is the left-hand side of the visual display 6, the X-axis runs along the bottom of the visual display 6, and the origin is the lower left-hand corner. The X-axis represents possible luma values of a pixel, and the Y-axis defines a normalized or weighted value for each possible value of the X-axis. For example, if the color of a pixel is being represented in YCrCb format, the X-axis represents the Y component of the pixel and may range from 0 to 255. The Y-axis, on the other hand, represents a range from zero to one where the highlight graph 54, midtone graph 56, and shadow graph 58 each have a weighted value from zero to one.

In the visual display 6, the dotted curve 10 represents the shadow graph 58. The value of the dotted curve 10 is high for lower values of luma and low for higher levels of luma. The dashed curve 12 represents the midtone graph 56. The value of the dashed curve 12 has its highest value for mid-range values of luma, and low values for higher and lower values of luma. The solid curve 14 represents the highlight graph 54. The value of the solid curve 14 is low for lower values of luma, and high for higher values of luma.

A display value to be assigned to a pixel is determined by comparing the graphs or the graph curves 10, 12, and 14 illustrated in FIG. 3 to determine which curve has the greatest weighted value for a given luma value. The visual display 6 appears to have three ranges: a shadow range 30 where the shadow graph has the greatest weighted value; a midtone ranged 32 where the midtone graph has the highest weighted value; and a luma range 34 where the luma graph has the highest weighted value. The boundaries of the luma regions are illustrated at 26 and 28.

The user interface 2 also may include a graph selection pane 4 for selecting the highlight curve 14, midtone curve 12, or shadow curve 10 of the visual display 6 to permit editing of the curve. In the example of FIG. 3, the radio button 3 next to the word "HIGHLIGHT" indicates that the highlight curve 14 is currently being edited. Control points 16, 18, 20, 22, and 24 define the highlight curve 14 in the visual display 6. Although five points are being used in the example of visual display 6, any number of points may be used depending upon an editor's preference and limits imposed by the application software being used.

The user interface 2 also may include a preview selection pane 8 to permit a user to select an image to preview in another visual display. In the example of FIG. 3, the radio button labeled "THREE TONE" indicates that the user has selected the three tone preview which allows the user to view a three tone presentation that illustrates the luma ranges created by the luma curves 10, 12, and 14. The radio button labeled "INPUT" allows a user to view the digital image before the luma curves, 10, 12, and 14 are applied. The radio button labeled "OUTPUT", allows a user to view the digital image with the luma curves, 10, 12, and 14 applied.

An editor may select an individual control point of the control points 16–24, and then move the point either up or down on the highlight curve 14. An editor also may add a new control point to the control points 16–24. The highlight curve 14 is redefined in response to changes, additions or deletions of control points. The curve may be redefined by interpolating points along the curve between the control points. Such interpolation can be accomplished for example by representing the curve using linear interpolation, cubic splines, or bezier curves.

Figure 4:
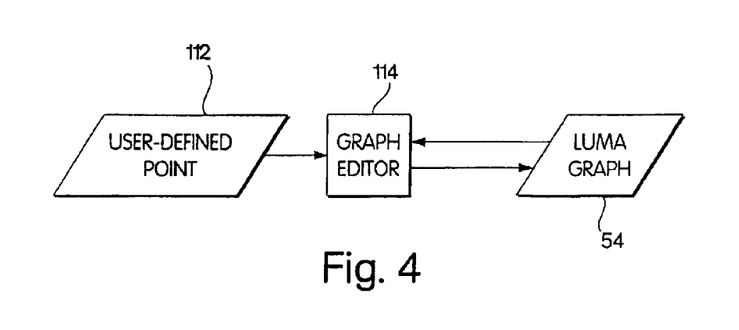
FIG. 4 is a data flow diagram illustrating an embodiment of a luma graph editing system.

Referring to FIG. 4, a graph editor 114 receives an editor-defined control point 112 for a curve of a graph, which may be a new point or a change in the position of an existing point. The graph editor 114 then interpolates all the points between the editor-defined control point and other control points on the curve to redefine the graph. The graph editor may employ linear interpolation, cubic splines, bezier curves, or other known methods of interpolation. The data structure that represents a luma graph, for example the highlight graph 54, the midtone graph 56, and the shadow graph 58 is described in more detail below.

Figure 5:
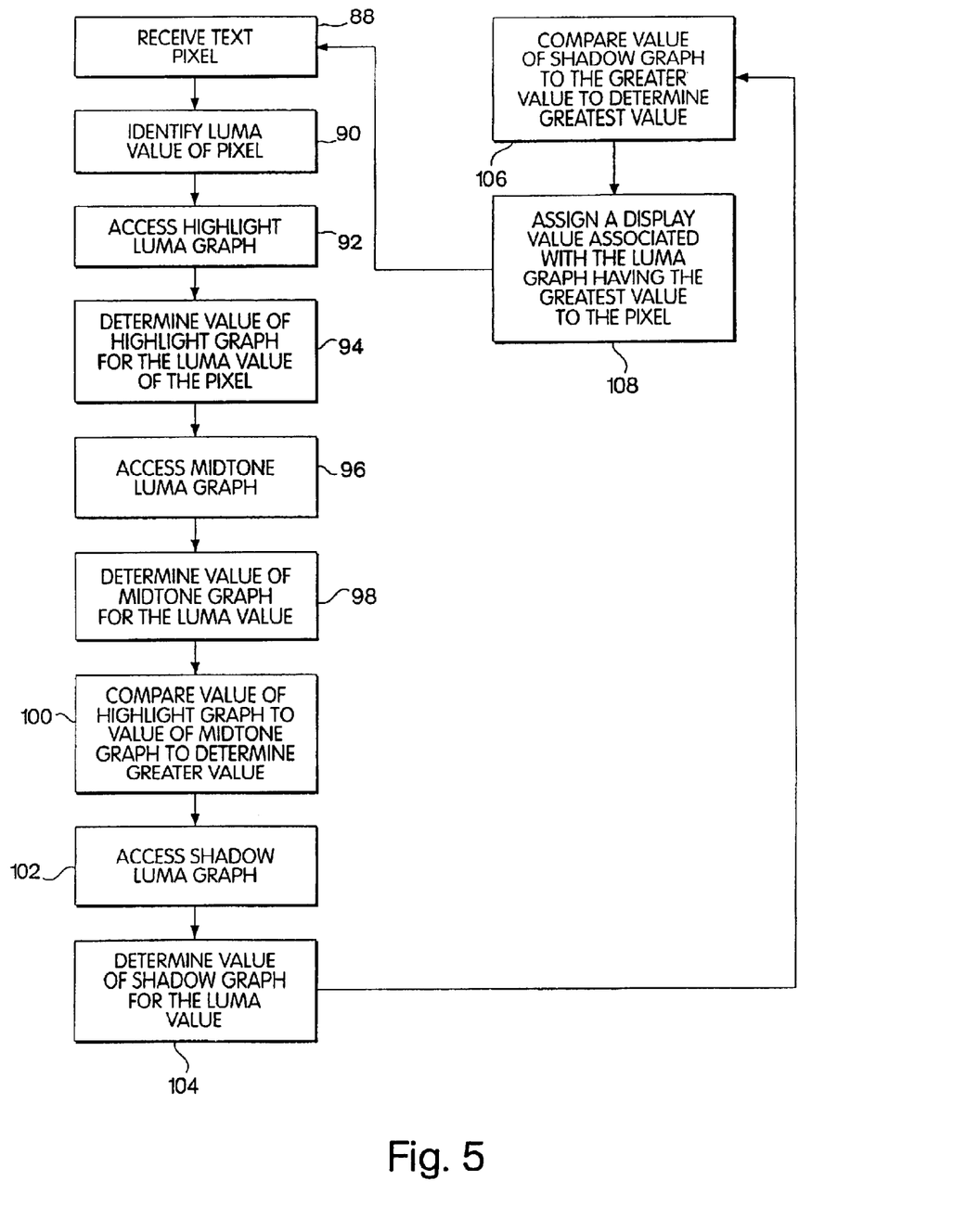
FIG. 5 is a flow chart illustrating an embodiment of a process for generating a three-tone representation of a digital image.

FIG. 5 is a flow chart illustrating an example method of generating a display value for a pixel that may be performed by the image generator 46 of FIG. 1. First, in steps 88 and 90, the next pixel of a digital image is received, and the luma value of the pixel identified. In steps 92 and 94, the highlight luma graph is accessed and a weighted value of the highlight graph for the luma value of the pixel is determined. In steps 96 and 98 the midtone luma graph is accessed and the weighted value of the midtone graph 4 of the luma value is determined. In step 100, the weighted value of the highlight graph is compared to the weighted value of the midtone graph to determine the greater value of the two.

In steps 102 and 104, the shadow luma graph is accessed and a weighted value of the shadow graph for the luma value is determined. In step 106, the value of the shadow graph is compared to the greater value of the highlight graph and the midtone graph, determined in step 100, to determine the greatest weighted value of the three graphs. The graph values may be compared in any order or in parallel. Steps 92, 96 and step 102 all may occur before the first determination of the value of the highlight graph in step 94. In step 108, a display value associated with the luma graph that had the greatest value for the luma value of the pixel is assigned to the pixel.

In an alternative embodiment, the luma graph with the greatest value is determined for each possible luma value before a pixel is received. In this embodiment, each entry of a single LUT holds the display value associated with the luma graph having the greatest value for a given luma value. Given a pixel, the luma value of the pixel is identified, the entry of the single LUT for the luma value is accessed, and the display value of the entry is assigned to the pixel.

In another alternative embodiment, a pixel is represented with RGB components, and three LUTs, one for each component, are used. Each LUT includes entries, and each entry holds the display value associated with the luma graph having the greatest value for a given luma value. A 3×3 matrix is applied to the RGB color to determine the luma value. This technique may be applied to other component formats, for example, CMY.

In yet another embodiment, the function associated with each luma graph is stored, and for each pixel received, the luma value is identified, and the weighted value of each luma graph for the luma value is determined, the luma graph with the greatest value is determined, and the display value associated with the determined luma graph is assigned to the pixel.

After a display value has been associated with each pixel of a digital image, the digital image may then be displayed, with each pixel being displayed as a color or a level of gray corresponding to the display value assigned to the pixel.

Figure 6:
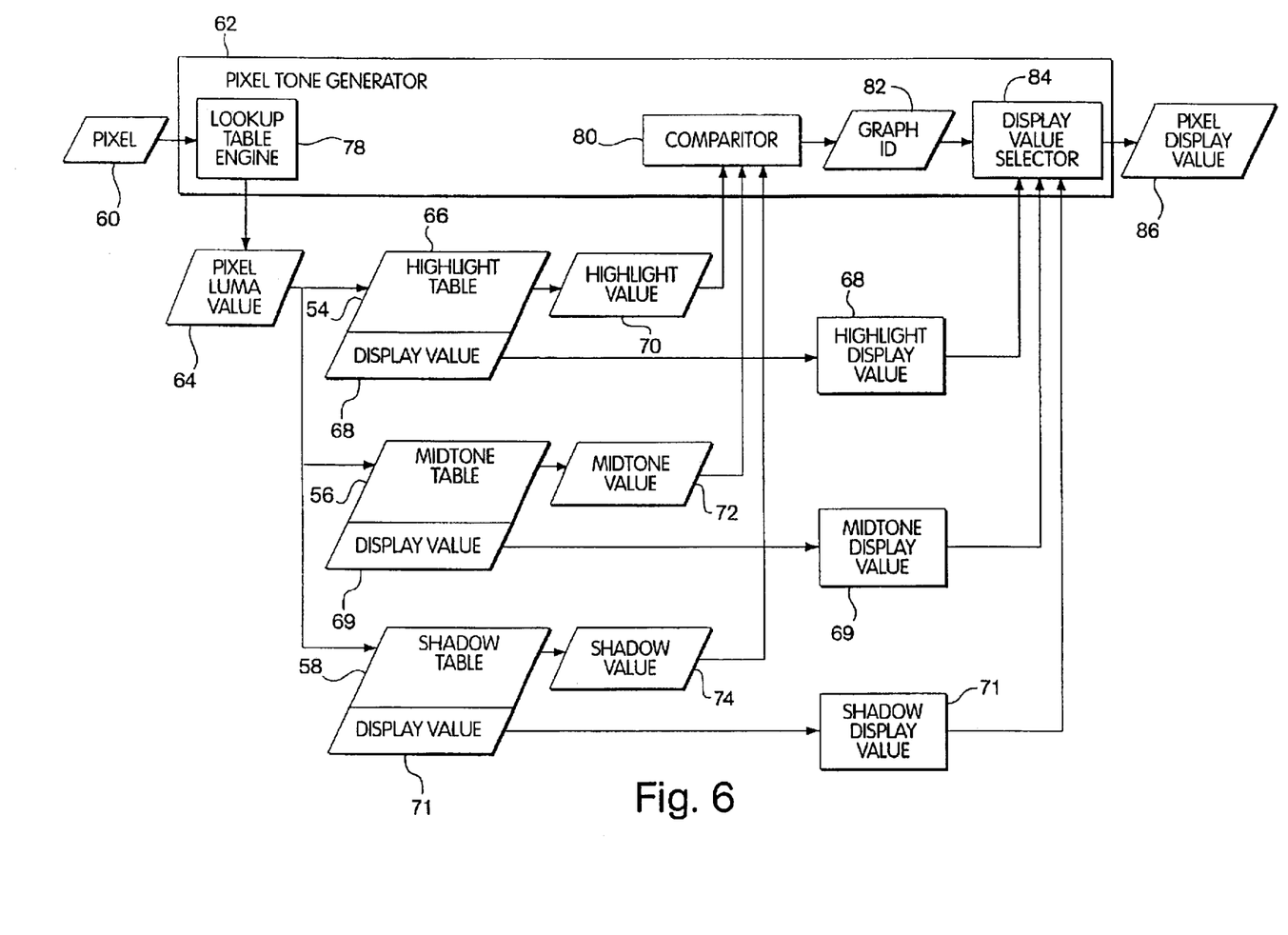
FIG. 6 is a data flow diagram illustrating an embodiment of the operation of the pixel tone generator of FIG. 1.

FIG. 6 is a data flow diagram illustrating the operation of the pixel tone generator 62 in more detail. The pixel tone generator 66 includes a lookup table (LUT) engine 78, a comparator 80, and a display value selector 84. Each of the highlight graph 54, the midtone graph 56, and the shadow table 58, include a luma graph lookup table (LUT) and a display value, for example, the highlight LUT 66 and display value 68 of the highlight graph 54.

The LUT engine 78 receives a pixel 60 and determines a pixel luma value 64 of the pixel. In an alternative embodiment, the LUT engine 78 receives the pixel luma value 64. The luma pixel value serves as a pointer to a value within each of the LUTs of the highlight graph 54, the midtone graph 56, and the shadow graph 58, respectively.

Figure 7:
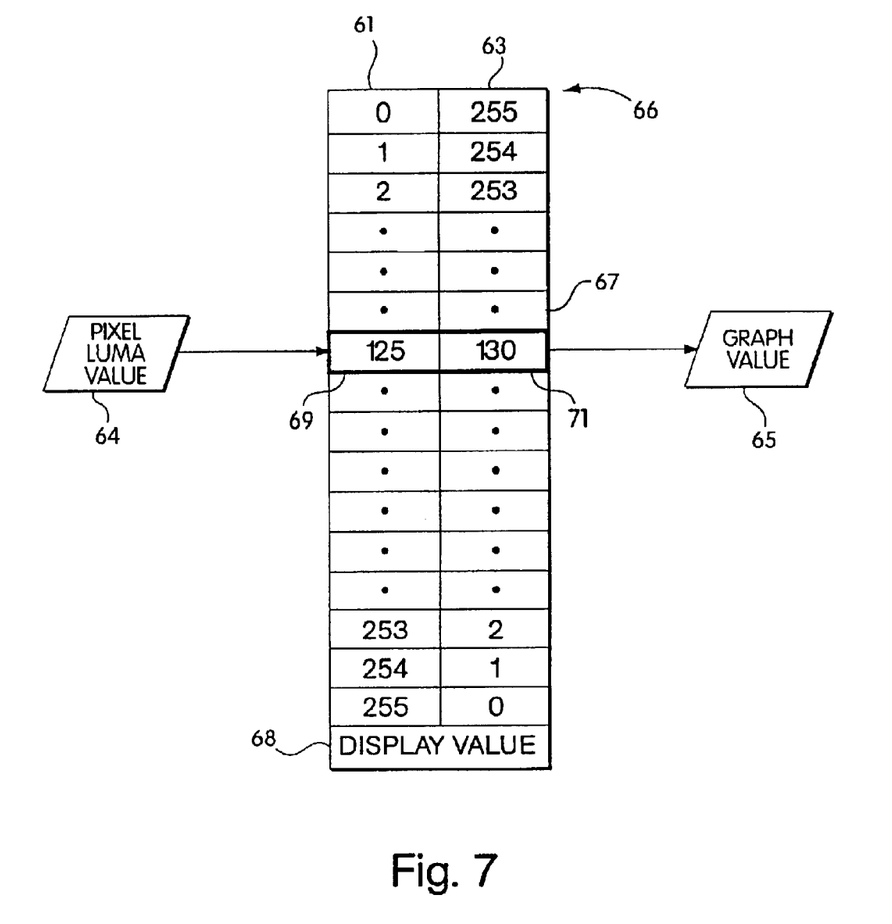
FIG. 7 is a block diagram of an embodiment of a data structure representing a luma graph.

FIG. 7 is a diagram illustrating an example embodiment of a luma graph LUT, for example highlight LUT 66. Highlight LUT 66 includes a number of entries 67 equal to the number of possible luma values of a pixel. Each entry 67 includes a pixel luma value 69 and the corresponding highlight graph value 71. Highlight LUT 66 has two columns: column 61 representing the possible pixel luma values and column 63 representing the corresponding highlight graph values for each luma value.

Returning to FIG. 6, the pixel luma value 64 points to an entry in each of the LUTS of the highlight graph 54, the midtone graph 56, and the shadow table 58, respectively. For each LUT, the luma graph value defined for the entry being pointed to, a highlight graph value 70, a midtone graph value 72, and a midtone graph value 74, respectively, is sent to the comparator 80 of the pixel tone generator 62.

The comparator 80 receives the highlight graph value 70, the midtone graph value 72, and the shadow graph value 74, and generates a graph ID 82. The graph ID indicates which of the graphs, highlight graph 54, midtone graph 56 and midtone graph 58, has the highest value for the given pixel luma values 64.

The display value selector 84 receives the graph ID 82, highlight display value 68, midtone display value 69, and shadow display value 71, and selects the display value from the graph identified by the graph ID 82. The display value selector 84 then assigns the selected display value 86 to the pixel 60, and outputs the selected display value 86.

The generation of a multi-tone representation of a digital image may be performed using a general purpose computer. It should be understood that generating a three-tone representation of a digital image is not limited by the specific computer described herein. Many other different machines may be used to implement the invention. Such a suitable computer system includes a processing unit which performs a variety of functions and a manner well-known in the art in response to instructions provided from an application program. The processing unit functions under control of a program known as the operating system, of which many types are known in the art. The steps of an application program are typically provided in random access memory (RAM) in machine-readable form because programs are typically stored on a non-volatile memory, such as a hard disk or floppy disk. When an editor selects an application program, it is loaded from the hard disk to the RAM, and the processing unit proceeds through the sequence of instructions of the application program.

The computer system also may include an editor input/output (I/O) interface. The editor interface typically includes a display apparatus (not shown), such as a cathode-ray-tube (CRT) display in an input device (not shown), such as a keyboard or mouse. A variety of other known input and output devices may be used, such as speech generation and recognition units, audio output devices, etc.

The computer system also may include a video and audio data I/O subsystem. Such a subsystem is well-known in the art and the present invention is not limited to the specific subsystem described herein. The audio portion of subsystem includes an analog-to-digital (A/D) converter (not shown), which receives analog audio information and converts it to digital information. The digital information may be compressed using known compression systems, for storage on the hard disk to use at another time. A typical video portion of subsystem includes a video image compressor/decompressor (not shown) of which many are known in the art. Such compressor/decompressors convert analog video information into compressed digital information. The compressed digital information may be stored on hard disk for use at a later time. An example of such a compressor/decompressor is described in U.S. Pat. No. 5,355,450. Video data also may remain uncompressed.

One or more output devices may be connected to the computer system. Example output devices include a cathode ray tube (CRT) display, liquid crystal displays (LCD) and other video output devices, printers, communication devices such as a modem, storage devices such as disk or tape, and audio output. One or more input devices may be connected to the computer system. Example input devices include a keyboard, keypad, track ball, mouse, pen and tablet, communication device, and data input devices such as audio and video capture devices and sensors. Generation of a three-tone representation of a digital image is not limited to the particular input or output devices used in combination with the computer system or to those described herein.

The computer system may be a general purpose computer system which is programmable using a computer programming language, such as "C++," JAVA or other language, such as a scripting language or even assembly language. The computer system may also be specially programmed, special purpose hardware. In a general purpose computer system, the processor is typically a commercially available processor, such as the series x86 and Pentium processors, available from Intel, similar devices from AMD and Cyrix, the 680X0 series microprocessors available from Motorola, and the PowerPC microprocessor from IBM. Many other processors are available. Such a microprocessor executes a program called an operating system, of which WindowsNT, Windows 95 or 98,UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

Such a system may be implemented in software or hardware or firmware, or a combination of the three. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

The computer system is not limited to a particular computer platform, particular processor, or particular programming language. Additionally, the computer system may be a multi processor computer system or may include multiple computers connected over a computer network. Each step of FIG. 5 also may be separate modules of a computer program, or may be separate computer programs. Such modules may be operable on separate computers.

Having now described some embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for color modification of an input image, comprising:
   receiving information defining at least three ranges of luma, wherein each of the at least three ranges of luma has an associated color modification that maps values for a pixel to modified values for the pixel, and a display value that defines a color in which pixels having luminance in the range of luma will be displayed;
   processing each pixel in the input image to classify the pixel in one of the at least three ranges of luma according to the luminance of the pixel;
   generating a multi-tone image from the input image, such that each pixel in the multi-tone image is set to the display value associated with the range of luma in which the corresponding pixel in the input image is classified, such that all pixels in the multi-tone image for which the corresponding pixels in the input image are in a same range of luma are set to the display value associated with that range;
   displaying the multi-tone image;
   processing each pixel in the input image by applying the color modifications associated with the ranges of luma to values for the pixel, according to the information defining the at least three ranges of luma and the luminance of the pixel to generate a modified values for the pixel, thereby generating an output image; and
   displaying the output image.

2. The method of claim 1, wherein the information defining at least three ranges of luma comprises a plurality of functions of luma.

3. The method of claim 1, wherein the display value associated with a range of luma is a level of gray.

4. The method of claim 1, wherein the display value associated with a range of luma is a color.

5. The method of claim 1, further comprising receiving from a user modifications to the information defining the ranges of luma.

6. The method of claim 1, further comprising receiving from a user modifications to the color modification associated with a range of luma.

7. A computer program product, comprising:
   a computer-readable medium;
   computer program instructions stored on the computer readable medium that, when executed by a computer, instruct the computer to perform a method for color modification of an input image, comprising:
   receiving information defining at least three ranges of luma, wherein each of the at least three ranges of luma has an associated color modification that maps values for a pixel to modified values for the pixel as a function of luminance of the pixel, and a display value that defines a color in which pixels having luminance in the range of luma will be displayed;
   processing each pixel in the input image to classify the pixel in one of the at least three ranges of luma according to the luminance of the pixel;
   generating a multi-tone image from the input image, such that each pixel in the multi-tone image is set to the display value associated with the range of luma in which the corresponding pixel in the input image is classified, such that all pixels in the multi-tone image for which the corresponding pixels in the input image are in a same range of luma are set to the display value associated with that range;
   displaying the multi-tone image;
   processing each pixel in the input image by applying the color modifications associated with the ranges of luma to values for the pixel, according to the information defining the at least three ranges of luma and the luminance of the pixel to generate modified values for the pixel, thereby generating an output image; and
   displaying the output image.

8. The computer program product of claim 7, wherein the information defining at least three ranges of luma comprises a plurality of functions of luma.

9. The computer program product of claim 7, wherein the display value associated with a range of luma is a level of gray.

10. The computer program product of claim 7, wherein the display value associated with a range of luma is a color.

11. The computer program product of claim 7, wherein the method performed by the computer further comprises receiving from a user modifications to the information defining the ranges of luma.

12. The computer program product of claim 7, wherein the method performed by the computer further comprises receiving from a user modifications to the color modification associated with a range of luma.

13. A system for color modification of an input image, comprising:
   means for defining at least three ranges of luma, wherein each of the at least three ranges of luma has an associated color modification that maps values for a pixel to modified values for the pixel as a function of luminance of the pixel, and a display value that defines a color in which pixels having luminance in the range of luma will be displayed;

means for classifying each pixel in the input image in one of the at least three ranges of luma according to the luminance of the pixel;

means for producing a multi-tone image from the input image, such that each pixel in the multi-tone image is set to the display value associated with the range of luma in which the corresponding pixel in the input image is classified, such that all pixels in the multi-tone image for which the corresponding pixels in the input image are in a same range of luma are set to the display value associated with that range;

means for displaying the multi-tone image on a display;

means for modifying pixels in the input image by applying the color modifications associated with the ranges of luma to values for the pixel, according to the information defining the at least three ranges of luma and the luminance of each pixel in the input image to generate modified values for each pixel, thereby generating an output image; and means for displaying the output image.

14. The system of claim 13, wherein the at least three ranges of luma are defined by a plurality of functions of luma.

15. The system of claim 13, wherein the display value associated with a range of luma is a level of gray.

16. The system of claim 13, wherein the display value associated with a range of luma is a color.

17. The system of claim 13, further comprising means for allowing a user to modify the defined the ranges of luma.

18. The system of claim 13, further comprising means for allowing a user to modify the color modification associated with a range of luma.

19. A method for color modification of an input image, comprising:

receiving information defining at least three ranges of luma, wherein each range of luma has an associated color modification that maps values for a pixel to modified values for the pixel, and a display value that defines a color in which pixels having luminance in the range of luma will be displayed;

classifying each pixel in the input image in one of the at least three ranges of luma according to the luminance of the pixel;

generating a multi-tone image from the input image, by setting each pixel in the multi-tone image to the display value associated with the range of luma in which the corresponding pixel in the input image is classified, such that all pixels in the multi-tone image for which the corresponding pixels in the input image are in a same range of luma are set to the display values associated with that range;

displaying the multi-tone image;

computing, for each pixel in the input image, modified values for the pixel by applying the color modifications to values for the pixel, according to the information defining the at least three ranges of luma and the luminance of the pixel, to generate an output image including the modified pixels; and displaying the modified image.

20. A method for color modification of an input image, comprising:

receiving information defining at least three ranges of luma, wherein each range of luma has an associated color modification and a display value;

classifying each pixel in the input image in one of the at least three ranges of luma;

generating a multi-tone image from the input image, by setting each pixel in the multi-tone image to the display value associated with the range of luma in which the corresponding pixel in the input image is classified;

displaying the multi-tone image such that all pixels in the multi-tone image for which the corresponding pixels in the input image are in a same range of luma are set to the display value associated with that range;

computing, for each pixel in the input image, a modified pixel according to a function of the color modifications associated with the ranges of luma, the information defining the at least three ranges of luma, and the luminance of the pixel, to generate an output image including the modified pixels; and displaying the output image;

wherein the information defining at least three ranges of luma comprises:

a highlight curve defined as a function of a luma component of a pixel with respect to a first axis representing the luma component and a second axis representing a normalization value;

a midtone curve defined as a function of a luma component of a pixel with respect to a first axis representing the luma component and a second axis representing a normalization value; and a shadow curve defined as a function of a luma component of a pixel with respect to a first axis representing the luma component and a second axis representing a normalization value.

21. The method of claim 20, wherein classifying each pixel in the input image comprises:

determining the normalization value corresponding to the luma component of the pixel for each of the highlight, midtone and shadow curves; and identifying one of the highlight, midtone and shadow curves that provides a highest normalization value for the pixel.

* * * * *